R. C. KINTZING.

DYNAMO OR MOTOR.

No. 11,354. Reissued July 25, 1893.

WITNESSES:

Gustave Ritenour.

Truman Bird.

INVENTOR

Kalston C. Kintzing

BY

Chandler, Maxwell & Philips

ATTORNEYS

UNITED STATES PATENT OFFICE.

RALSTON C. KINTZING, OF BROOKLYN, NEW YORK, ASSIGNOR TO THE CROCKER-WHEELER ELECTRIC COMPANY, OF NEW JERSEY.

DYNAMO OR MOTOR.

SPECIFICATION forming part of Reissued Letters Patent No. 11,354, dated July 25, 1893.

Original No. 470,057, dated March 1, 1892. Application for reissue filed January 25, 1893. Serial No. 459,742.

*To all whom it may concern:*

Be it known that I, RALSTON C. KINTZING, a citizen of the United States, and a resident of Brooklyn, in the county of Kings and State of New York, have invented certain new and useful Improvements in Dynamos or Motors, of which the following is a specification.

The object of my invention is to construct a cheap, simple, and efficient dynamo or motor; and it relates particularly to the form and arrangement of the frame-work constituting the field, whereby the best results are produced in the simplest form. It is of the spherical type, the armature and the iron-clad casing constituting the magnetic bond between the field magnets, being globular in form whereby I am enabled to make not only a most efficient motor, but it also presents exteriorly a fine appearance.

Figure 1:
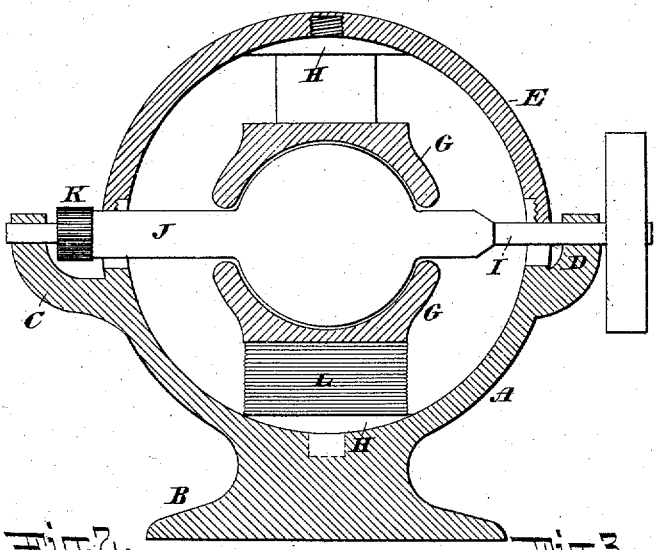
Figure 2:
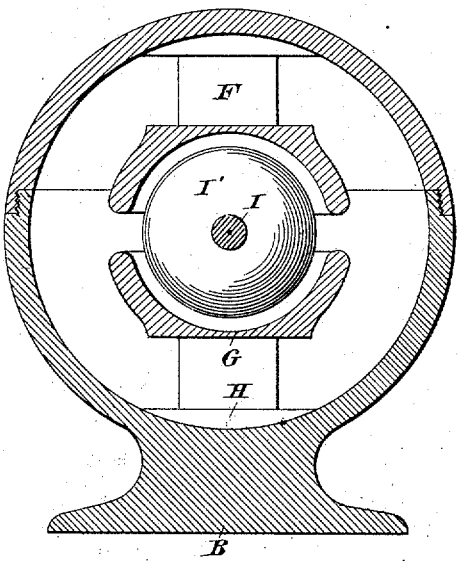
Figure 3:
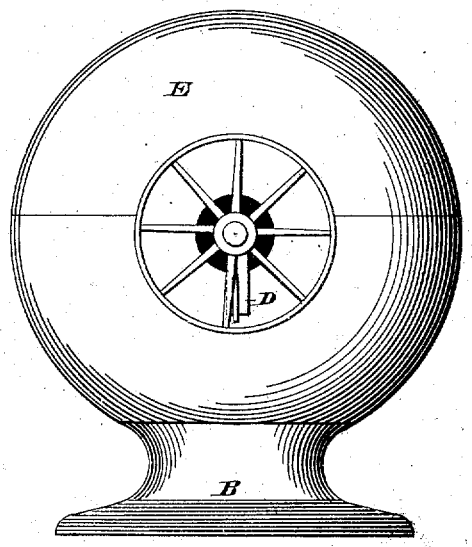

In the drawings Figure 1 is a central vertical longitudinal section of the motor; Fig. 2, a central vertical cross-section, and Fig. 3, an exterior view of one end of the same.

In constructing the invention I form the casing or shell in two parts divided centrally on a horizontal plane, the lower half or hemisphere A having a base B integral therewith and at each end a bracket or arm, as C D, in which the armature shaft is journaled. The upper hemisphere E is a plain shell, and these two parts are united by means of screw-threaded edges, as shown, or in any other manner—as for instance, by having them flanged and bolted together. Centrally within these shells are screw-threaded sockets to receive the screw-threaded ends of the field-magnet cores F. These field magnets have their pole-pieces or heads G cup-shaped, the curved sockets in the ends being cut out to conform to the shape of the spherical armature. The base H of the core is designed to fit snugly against the inner side of the shell. The armature-shaft I, which passes horizontally through these shells, has centrally within a spherical armature-core I′, and wound thereon in any suitable manner is the insulated wire, any form of winding being adapted for the purpose.

In Fig. 1. I show the shaft and armature-core covered with insulated wire, as shown at J, and connected up with the commutator plates K, and one of the field-magnets is also wound, as at L; but I have made no attempt to connect up the wires, because the manner of connecting same forms no part of my invention.

My invention has particular reference to the construction and form of the iron-clad shell or frame forming the magnetic bond between the field-magnets, and incidentally to the attachments thereto.

Both the fields and the armature may be wound as desired but I prefer the ring type, with the outer surface spherical in shape and the inner surface flat. The coils are either wound on the ring by hand or are slipped on after being wound, and the whole armature is fastened to the shaft by means of a non-magnetic spider, or in any way that will prevent its resting on the shaft; or it may be composed of a hollow spherical core, over the outer surface of which is wound the wire after being insulated from the core. The field core is preferably covered with copper before being wound, and the wires may be wound directly on the core or on a spool and afterward slipped on.

By employing a spherical frame connecting the field-magnets, as shown, a perfect magnetic circuit is made, eliminating magnetic leakage, and by spherical poles and armatures the lines of force are concentrated more directly upon the armature, as well as giving the armature greater surface. I also claim that I am enabled to obtain by this a more intense field, slower speed, greater solidity and efficiency, protection to the field and armature, ease of construction, and general simplicity in construction.

What I claim as new is—

1. In a dynamo or motor a hollow sphere made of magnetic material and included within the magnetic circuit of said dynamo or motor and inclosing the armature thereof substantially as set forth.

2. A dynamo or motor having its pole pieces and armature inclosed in a two part magnetic sphere, substantially as set forth.

3. A dynamo or motor having a frame consisting of a hollow sphere of magnetic material, and field pole pieces upon the inner surface of the sphere magnetically connected through the body thereof, substantially as described.

4. A dynamo or motor consisting of a hollow sphere of magnetic material, field poles upon the inner surface of the sphere magnetically connected through the body thereof, and an armature mounted to revolve within the sphere between the poles, substantially as described.

5. A dynamo or motor having a frame consisting of a hollow sphere of magnetic material, and field pole pieces upon the inner surface of the sphere magnetically connected through the body thereof, said sphere being divisible to facilitate assembling the parts of the machine, substantially as described.

6. A dynamo or motor composed of a hollow spherical shell in two parts, the lower part or hemisphere having base and bracket bearings for the shaft integral therewith, the opposing field-magnets being attached to the two hemispheres, respectively, as set forth.

7. A dynamo or motor having a hollow spherical shell to constitute a frame having within the field-magnet cores removably attached to the shells, substantially as set forth.

8. A dynamo or motor having a hollow spherical frame, field-magnets within said shell, having hemispherical pole-pieces, and a spherical armature-core, substantially as set forth.

9. A dynamo or motor having a frame composed of two hollow hemispheres secured together, field-magnets removably attached within and provided with hemispherical pole-pieces, and a spherical armature-core, substantially as set forth.

10. The combination of two hollow hemispherical shells constituting a frame for a dynamo or motor, joined together on a horizontal plane, a base and journal-bearing arms cast with the lower portion, a horizontal armature-shaft journaled in said arms, a removable field-magnet vertically disposed and attached to each hemisphere within, and a spherical armature core on said shaft, substantially as set forth.

In testimony whereof I affix my signature, in presence of two witnesses, this 21st day of January, 1893.

RALSTON C. KINTZING.

Witnesses:
J. WARREN BIRD,
WM. F. REYNOLDS.